(12) United States Patent
Norland

(10) Patent No.: US 7,004,639 B2
(45) Date of Patent: Feb. 28, 2006

(54) INTERFEROMETRIC MICROSCOPE FIXTURE AND METHOD OF USE

(75) Inventor: Eric Norland, Cranbury, NJ (US)

(73) Assignee: Norland Products, Inc., Cranbury, NJ (US)

( * ) Notice: Subject to any disclaimer, the term of this patent is extended or adjusted under 35 U.S.C. 154(b) by 15 days.

(21) Appl. No.: 10/620,540

(22) Filed: Jul. 16, 2003

(65) Prior Publication Data

US 2004/0013394 A1 Jan. 22, 2004

Related U.S. Application Data

(60) Provisional application No. 60/396,248, filed on Jul. 16, 2002.

(51) Int. Cl.
G02B 6/36 (2006.01)
G02B 6/38 (2006.01)
G02B 6/00 (2006.01)
G01N 21/00 (2006.01)

(52) U.S. Cl. .......................... 385/53; 385/63; 385/139; 356/73.1

(58) Field of Classification Search .................. 385/53, 385/76, 77, 137; 356/73.1; 324/754
See application file for complete search history.

(56) References Cited

U.S. PATENT DOCUMENTS

| 6,215,555 | B1 | 4/2001 | Chivers |
| 6,412,987 | B1 * | 7/2002 | Horwitz et al. ............... 385/56 |
| 6,752,536 | B1 * | 6/2004 | Boyer et al. .................. 385/60 |
| 2004/0045509 | A1 * | 3/2004 | Or et al. ..................... 118/729 |

* cited by examiner

*Primary Examiner*—Frank G. Font
*Assistant Examiner*—Charlie Peng
(74) *Attorney, Agent, or Firm*—Akin Gump Strauss Hauer & Feld, LLP

(57) ABSTRACT

A holding fixture for use with an interferometric optical microscope is adapted to receive an optical fiber connector. The fixture comprises a base plate mountable to the microscope and having a base plate opening sized to receive the optical fiber connector. An aperture plate is connected to the base plate, the aperture plate having an aperture opening overlapping the base plate opening. The fixture allows the optical fiber connector to be held in a precise and repeatable orientation relative to the microscope in turn facilitating accurate and precise measurements of endface geometry of the optical fiber connector. A method of using the fixture allows a calibration factor to be calculated for the fixture.

13 Claims, 4 Drawing Sheets

PRIOR ART

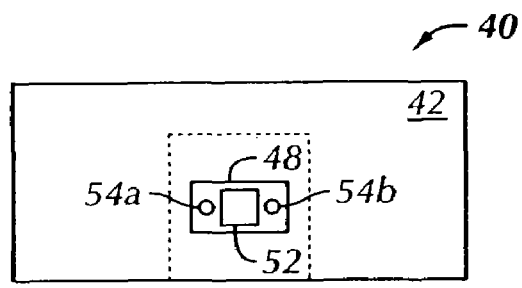
*FIG. 3A*
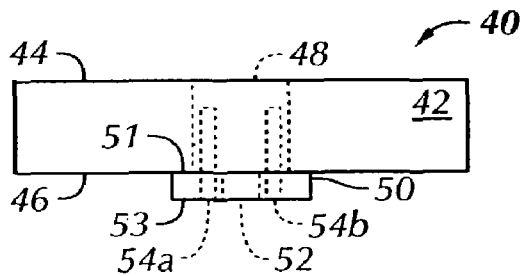 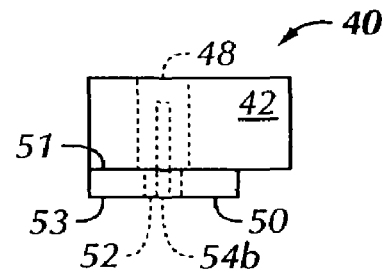
*FIG. 3B*  *FIG. 3C*
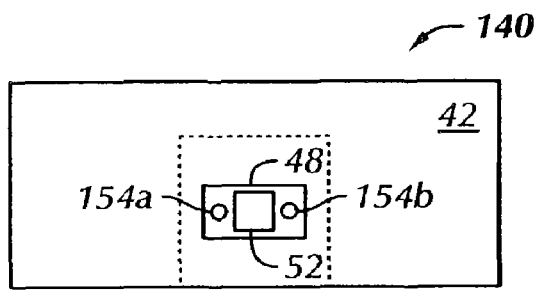
*FIG. 4A*
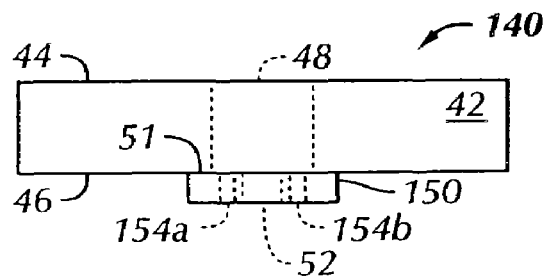 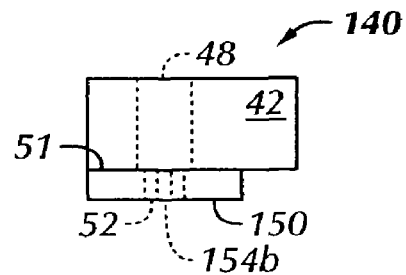
*FIG. 4B*  *FIG. 4C*

INTERFEROMETRIC MICROSCOPE FIXTURE AND METHOD OF USE

CROSS-REFERENCE TO RELATED APPLICATIONS

This application claims benefit of U.S. Provisional Patent Application 60/396,248, "Interferometric Holding Fixture for Multifiber Optical Connectors", filed Jul. 16, 2002.

BACKGROUND OF THE INVENTION

The present invention relates to a fixture and method for measuring the end face geometry and angle of polish of guide pin based multi-fiber fiber optic connectors using an interferometric microscope.

Optical fibers allow the transmission of data over great distances using light signals. The basic construction of the optical fiber which is made of either glass, a polymeric material or a combination of both, includes a small core, surrounded by a lower index cladding material. The light signal travels through the core and if it travels to the edge of the core, the refractive index of the cladding causes it to reflect back toward the center and continue down the fiber core. A high performance fiber optic connection is made between two fibers when the fiber ends are brought into contact with the cores in precise axial alignment so that the light signal can pass from one fiber core end to the other.

Multifiber ferrules (illustrated in FIG. 1) or connectors allow anywhere from 2 to 72 fibers in a single ferrule to be intermated with one another. These high densities offer advantages in time, money and size for the growing demands of data hungry applications. Guide pin based multifiber connectors are intermated with the use of guide holes which are molded or machined symmetrically on both edges of the connectors and use precision machined, matching guide pins that slide tightly into the guide holes and provide a common axis for the guide holes of mating connectors.

In this patent, the terms "ferrule" and "connector" are used interchangeably, with the "ferrule" typically referring to the central element of the connector which includes the fibers and the guide holes and the assembled "connector" which refers to the polished ferrule with some type of connector housing to provide stability for when they are mated.

In general, manufacturers desire to make multifiber connectors with the greatest efficiency in light transmission. The transmission loss of the connector at the fiber to fiber interface is attributed to three main factors: 1. Transverse offset of the fibers; 2. Fiber end gap; and 3. Mechanical instability.

The transverse offset is the error due to lateral misalignment of the fiber optic cores. This is controlled by dimensional tolerances in the manufacturing of the fiber and the ferrule and the guide pins. Fiber end gap is the error due to the fiber tips not forming the intimate optical contact with each other as required for good transmission. If the fibers do not make good contact, an air gap is formed that causes light to be reflected back into the system (back reflection) which can deteriorate the quality of the signal. The mechanical stability is related to the end face angle of the connectors. If the connectors are not polished reasonably flat on the end faces with the fibers, the ability of the connectors to form a stable connection when intermated is affected.

Polishing methods for the connector end faces are still being optimized. Depending on the performance requirements, the final connector end face geometry may be a flat polish, a protruded fiber polish or an angled protruded fiber polish. Ideally, for good physical contact, the fiber ends of the connector should be in the same plane. For mechanical stability, the critical requirement is that the end face geometry must be controlled to allow the fibers, and not the ferrule, to be the first to contact. When two connectors mate in this manner, the fibers align with each other and compress uniformly to provide controlled, intimate, optical contact.

There has long been a need to inspect the end of a guide pin based multifiber optical connector for information on the geometry of the end face to control the polishing process and to confirm quality for assurance of performance in an application. Typical parameters to be measured are: radius of curvature of the ferrule and fiber end, angle of the end face of the ferrule, symmetry of the polish, and any undercut or protrusion of the fibers with reference to the ferrule surface Interferometry is one of the preferred methods for measuring the surface of a multiple fiber optical connector because the resulting fringe pattern provides three dimensional information about the surface of the connector, and allows the above-described parameters to be accurately estimated or calculated. In order to use interferometry to measure the end face geometry and angle of the polish of a multiple fiber optical connector, it is necessary to stably hold the connector in a known position which is both precise and repeatable and typically is perpendicular, with respect to a reference surface in an interferometer. Such precision positioning is necessary to provide consistent, accurate, and reproducible measurements whenever a connector is inserted into a measuring instrument.

For example, MT or MiniMT type guide pin based connectors having a flat or slightly domed shaped end face are intended to be polished so that the optical fibers are slightly protruding from the ferrule surface. When two MT connectors are brought into contact, two guide pins which have been preinserted in predetermined locations in one connector mate with two guide holes which have been established at predetermined corresponding locations in the opposing connector thereby providing precise alignment of the fiber cores and holding both connectors perpendicular to each other. At the same time, the fibers in both connectors contact one another and compress slightly to form intimate optical contact which minimizes reflections at the interface. In order to guarantee that the fibers make contact first without any interference from the ferrule, a typical standard for end face geometry allows from 1 to 3 microns of fiber protrusion and an end face angle in the X and Y direction of 0.20° or less.

Industry standards recognize that the ideal end face surface of the connector should be a plane precisely perpendicular to the guide holes since these determine the angle on contact. So all angular measurements of the end face surface must use the guide holes as a reference. Since the guide holes themselves can not be readily measured, guide pins must be used in some manner to reference the guide holes.

Because of the tight tolerances required in the manufacturing process, and the need to hold such tolerances to a hundredth of a degree of accuracy, the slightest variation in ferrule position from a precise and repeatable axis with respect to the reference surface will lead to varying measurements depending on the position of the ferrule around the actual axis. In the prior art, this problem has been addressed with some success by using reference guide pins which has been machined or polished "flat". In other words, the end of the guide pin is machined or polished to form a flat surface which is designed to be perpendicular to the cylindrical sides of the pin. The reference pins are inserted into the connector guide holes before placing the connector onto the interferometer. When the interferometer provides the three dimensional information about the end face of the connector, the average angle of the two "flat" guide pins are used as a reference plane and is compared to the best fit plane of the ferrule end face to calculate the angle of the end face surface.

The difficulty with this prior art method is in the inability to get a repeatable reference surface or "flat" guide pin. The typical guide pin is only 0.7 mm in diameter. It can vary in length from 3 to 12 mm. Even with extreme precision machining, it is not always possible to get the end of such a tiny cylindrical pin to be perfectly flat. The problem is there is no reference surface on the cylindrical walls with which to guarantee the position either in manufacturing or when trying to measure. Since it is not possible to measure the accuracy of the flatness of the specially prepared guide pins, the prior art method is only a relative method. There is no true reference or method available to certify the measurement. Each one is different and the measurements will vary depending on how the guide pins are inserted into the guide holes. The direction of the angle of the "flat" pins in the X and Y axis is used to compare it with the X and Y angle of the measured connector end face. Since two guide pins are used, each one contributes its own variations and the error could be doubled.

Another difficulty with the prior art method is the general handling of the tiny components. It is not easy to manually hold the guide pins for insertion or for removing from the guide holes in the connectors. Fixturing has been designed to hold the pins for insertion. This helps but it requires extra steps and more time for each connector before the measurement process can begin.

SUMMARY OF THE INVENTION

Briefly stated, one aspect of the present invention is directed to a holding fixture for use with an interferometric optical microscope. The fixture is adapted to receive an optical fiber connector having first and second guide holes. The fixture comprises a base plate mountable to the microscope and having an opening sized to receive the optical fiber connector. An aperture plate is connected to the base plate, the aperture plate having an aperture overlapping the base plate opening. The aperture plate further includes first and second guide pins adapted to fit within the connector guide holes when the optical fiber connector is received within the base plate opening. The fixture allows the optical fiber connector to be held in a precise and repeatable orientation relative to the microscope in turn facilitating accurate and precise measurements of dimensional characteristics of the optical fiber connector.

Another aspect of the of the present invention is directed to a holding fixture for use with an interferometric optical microscope, the fixture being adapted to receive an optical fiber connector having first and second guide pins. The fixture comprises a base plate mountable to the microscope and having a base plate opening sized to receive the optical fiber connector. An aperture plate is mounted to the base plate, the aperture plate having an aperture opening overlapping the base plate opening. The aperture plate further includes first and second guide holes adapted to receive the connector guide pins. The fixture allows the optical fiber connector to be held in a precise and repeatable orientation relative to the microscope in turn facilitating accurate and precise measurements of dimensional characteristics of the optical fiber connector.

Still another aspect of the present invention is directed to a method of measuring dimensional characteristics of an optical fiber connector. The method comprises the steps of providing an interferometric microscope having a holding fixture connected thereto, the fixture being adapted to receive and hold, in a fixed, repeatable orientation, the optical connector; installing the optical fiber connector in the fixture in a first orientation; and measuring dimensional characteristics of the optical fiber connector.

BRIEF DESCRIPTION OF THE SEVERAL VIEWS OF THE DRAWINGS

The foregoing summary as well as the following detailed description of preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIGS. 3A, 3B and 3C are a series of three schematic diagrams (top view, front view and side view) showing the fixture of FIG. 2;

FIGS. 4A, 4B and 4C are a series of three schematic diagrams (top view, front view and side view) showing a fixture in accordance with an alternate embodiment of the present invention;

DETAILED DESCRIPTION OF THE INVENTION

Figure 1:
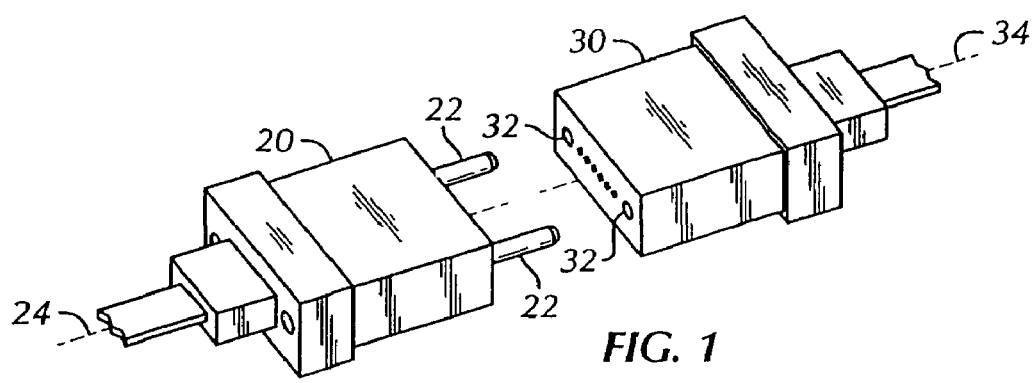
FIG. 1 is a perspective view of a set of male and female multiple fiber optical connectors about to be connected together.

Certain terminology is used in the following description for convenience only and is not limiting. The words "right", "left", "top", and "bottom" designate directions in the drawings to which reference is made. The words "inwardly" and "outwardly" refer to directions toward and away from, respectively, the geometric center of the fixture and designated parts thereof. The terminology includes the words above specifically mentioned, derivatives thereof and words of similar import.

Figure 2:
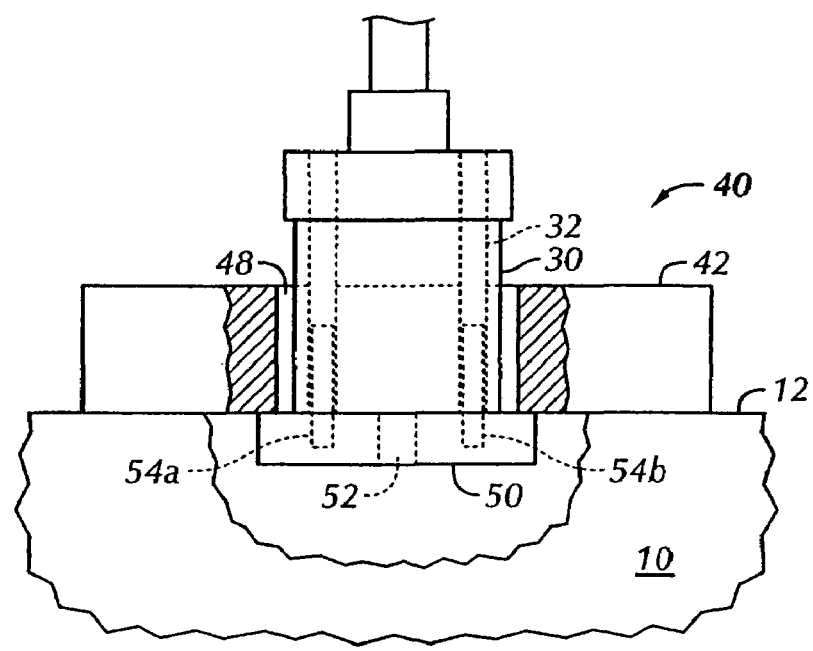
FIG. 2 is a side elevational view, partly in cross section, showing a fixture in accordance with a preferred embodiment of the present invention, the fixture mounted to an interferometric microscope and a female multi-fiber optical connector installed in the fixture.

Referring to FIGS. 1–3, there is shown a first preferred embodiment of a fixture 40 in accordance with the present invention. The fixture 40 is used in combination with an interferometric microscope 10 to hold a female multi-fiber optical connector 30. As shown in FIG. 1, and as discussed above, it is known in the art to provide male and female multi-fiber optical connectors 20, 30, respectively. The male connector 20 is typically provided with a pair of guide pins 22. The female connector 30 is provided with a corresponding pair of guide holes 32. The first embodiment fixture 40 has first and second guide pins 54a, 54b adapted to mate with the guide holes 32 of the female connector 30. The fixture 40 is thus a male fixture 40. The male fixture 40 allows the female connector 30 to be held in a precise and repeatable orientation relative to the microscope 10, allowing accurate and precise measurements of dimensional characteristics of the female connector 30 to be made.

The male fixture 40 comprises a generally parallelepiped-shaped base plate 42 which is mountable to a mounting surface 12 of the microscope 10. The base plate 42 is preferably removably attached to the microscope 10 using conventional fasteners, such as screws (not shown). The base plate 42 includes an upper surface 44 and a lower surface 46. The base plate 42 further includes a central generally rectangular-shaped opening 48 extending completely therethrough from the upper surface 44 to the lower surface 46. The opening 48 is sized for receiving the female connector 30 so that the female connector 30 is guided into position on insertion but the opening 48 is large enough to prevent any contact with the sidewalls of the connector 30 when seated within the fixture 40. It will be appreciated by those of ordinary skill in the art that the size and shape of the opening 48 may vary depending upon the style, size and shape of the connector being measured. Accordingly, the size and shape of the opening 48 should not be considered a limitation on the present invention.

The male fixture 40 further includes an aperture plate 50. The aperture plate 50 in the present embodiment is at least slightly greater in size than the opening 48 extending through the base plate 42. The aperture plate 50 is secured along an upper surface 51 to the lower surface 46 of the base plate 41 so that the aperture plate 50 effectively covers the opening 48. The aperture plate 50 further includes a lower surface 53. The aperture plate 50 also includes an opening or aperture 52 extending completely therethrough. As illustrated particularly in FIGS. 3A–3C, the aperture 52 is generally rectangular in shape and is smaller than the opening 48 of the base plate 42. It will be appreciated by those of ordinary skill in the art that the exact shape and size of the aperture 52 will vary and is not meant to be a limitation upon the present invention.

The aperture plate 50 further includes the pair of guide pins 54a and 54b extending upwardly therefrom and into the opening 48 of the base plate 42. The guide pins 54a, 54b are precisely sized and aligned to mate with the guide holes 32 of the female connector 30 when inserted into the opening 48. The guide pins 54a and 54b preferably extend about 4 to 5 mm above the upper surface 51 of the aperture plate 50. In this manner, the male fixture 40 may be employed for receiving and retaining therein the female connector 30 for making the required measurements to ascertain the above-described parameters in a precise, repeatable manner.

With the male fixture 40 for holding a female connector 30 within the optical interferometer 10, the difficulties of the prior art are overcome. Because the guide pins 54a, 54b are fixed inside the male fixture 40, if there are slight variations in the angular position of the pins 54a, 54b in the male fixture 40, the variance can be measured and taken into consideration for the final angular measurement.

The base plate 42, aperture plate 50 and guide pins 54a, 54b are preferably made of a rigid, high strength material such as stainless steel, carbide steel or some other metal or metal alloy, a high strength polymeric material or the like. The artisan will recognize that the material(s) chosen must be capable of being machined or otherwise formed to very close tolerances.

Figure 5A:
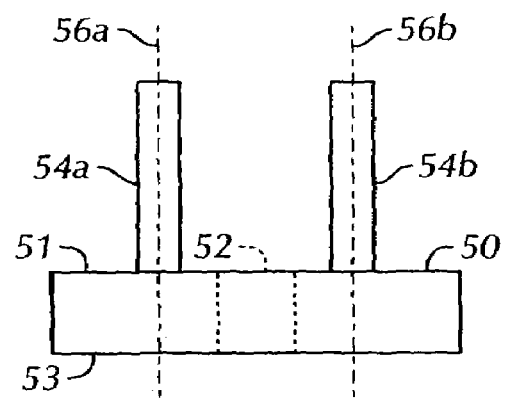
FIGS. 5A, 5B, 5C and 5D are schematic diagrams illustrating three alternative embodiments of guide pins of the present invention.
Figure 5B:
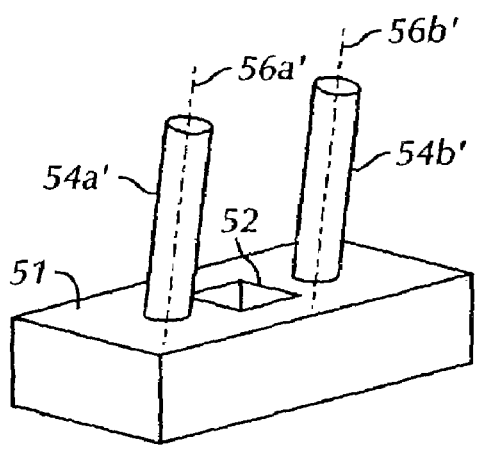
Figure 5C:
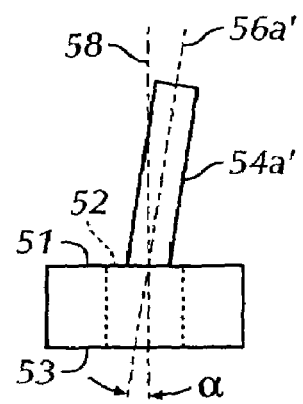
Figure 5D:
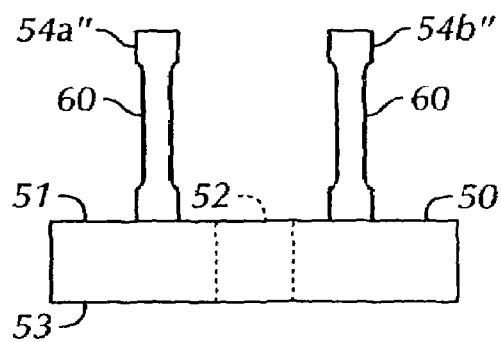

FIGS. 5A–5D illustrate various alternative embodiments of the guide pins 54a and 54b. In a first embodiment illustrated in FIG. 5A, the guide pins 54a and 54b are of a generally constant diameter and have longitudinal axes 56a and 56b, respectively. The longitudinal axes 56a and 56b are generally parallel to one another and generally perpendicular to the upper surface 51 of the aperture plate 50. Alternatively, as illustrated in FIGS. 5B and 5C, in a second embodiment guide pins 54a', 54b' have a predetermined angular offset $\alpha$ relative to the lines 58 perpendicular to the aperture plate lower surface 53. The angular offset $\alpha$ is typically 8 degrees. This second embodiment pin arrangement allows connectors having an angled polish to be held at the predetermined angle so that the angled end face is generally parallel to a reference mirror component of the interfemetric microscope 10. This generally parallel orientation is required to obtain a suitable interference pattern and measurement of the connector geometry. Any variation from the predetermined angle can be ascertained and the total angle of the end face can be calculated. In a third embodiment, guide pins 54a", 54b" have a "barbell"-shaped profile in which the pins 54a" and 54b" have a relief 60 cut into the middle portion along the length of the pins 54a", 54b", as illustrated in FIG. 5D. The relief 60 allows connectors 30 to be more easily installed over pins 54a" and 54b" and provides for a straighter line contact between the tip and base of the pins 54a", 54b" and the internal bore of the guide holes 32.

Referring to FIGS. 4A–4C, there is shown a second preferred embodiment of a fixture in accordance with the present invention. In the second preferred embodiment, a female fixture 140 includes the base plate 42 of the male fixture 40, but replaces the aperture plate 50 with a female aperture plate 150. The female aperture plate 150 is provided with an aperture 52 similar to the aperture 52 of the aperture plate 50, but is also provided with guide pin holes 154a and 154b, rather than the guide pins 54a and 54b of the aperture plate 50. Thus, the female fixture 140 is adapted to receive the male connector 20. The structure and operation of the female fixture 140 is otherwise similar to the structure and operation of the male fixture 40.

Figure 6:
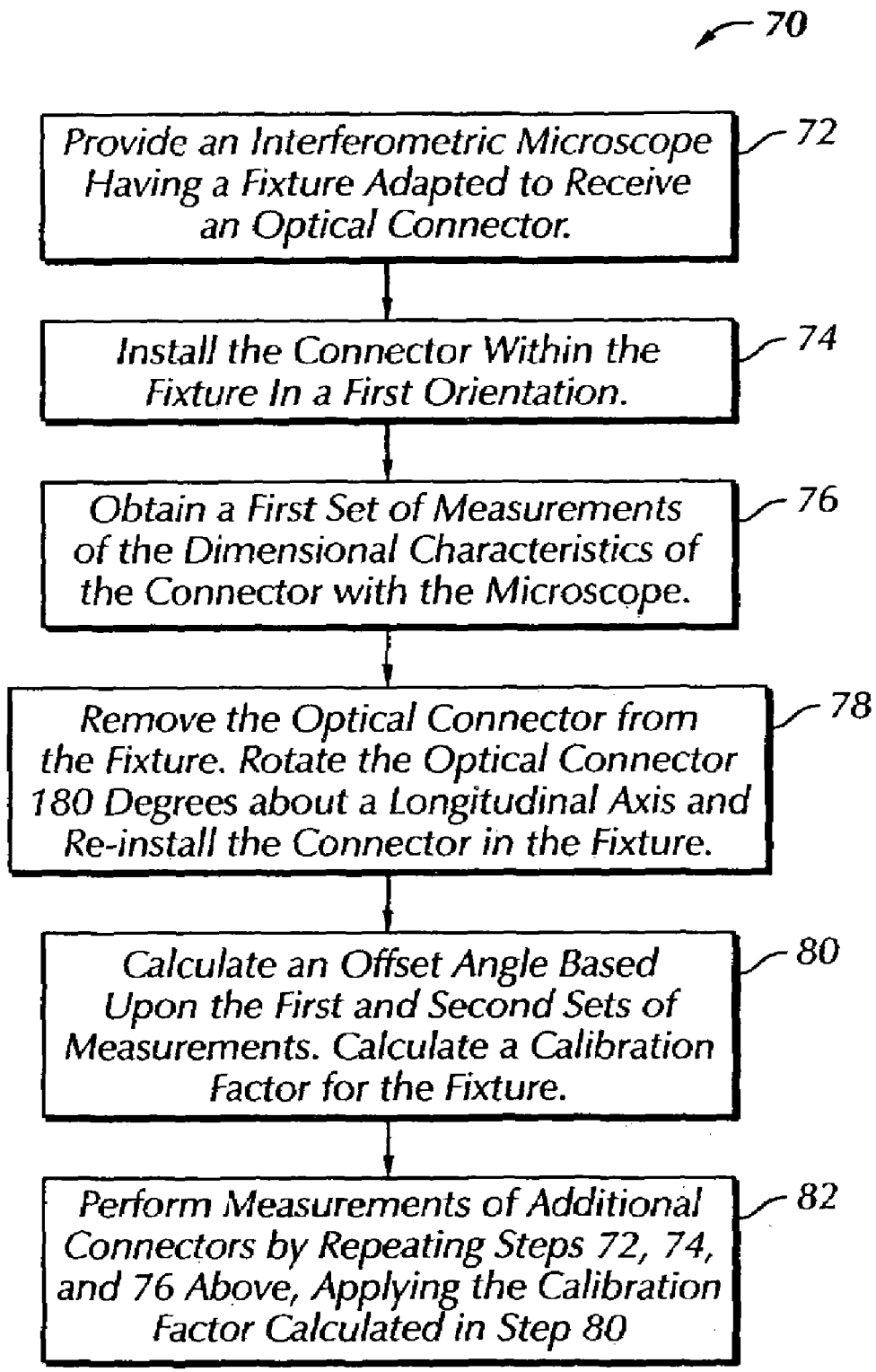
FIG. 6 is a diagram of the steps of a method of measuring dimensional characteristics of an optical fiber connector in accordance with the present invention.

Referring to FIG. 6, the above disclosed male and female fixtures 40, 140 and microscope 10 of the present invention are preferably used in accordance with a method generally designated 70. The method 70 provides for obtaining measurements of dimensional characteristics of the male and female connectors 20, 30, respectively, and determining a calibration factor for the fixtures 140, 40, respectively, based upon those measurements. The method 70 comprises seven steps as shown in FIG. 6.

At a first step 72, the user provides an interferometric microscope 10 having a fixture such as the male fixture 40 adapted to receive a female connector 30 or a female fixture 140 adapted to receive a male connector 20.

At a second step 74, the user installs a female connector 30 or a male connector 20 into the male fixture 40 or the female fixture 140, as appropriate.

At a third step 76, the user obtains a first set of measurements of the dimensional characteristics of the connector 20 or 30. The measurements are conventional in the art of multi-fiber optical connectors, and are obtained in a manner well-known in the art of interferometric microscopes.

At a fourth step 78, the user removes the connector 20 or 30 from the fixture 140 or 40, respectively, rotates the connector 180 degrees about a longitudinal axis 24 or 34 of the connector 20 or 30, and re-installs the connector 20 or 30 into the fixture 140 or 40.

At a fifth step 80, the user obtains a second set of measurements of the dimensional characteristics of the connector 20 or 30.

At a sixth step 80, the user calculates an offset angle based upon the first and second sets of measurements. A calibration factor for the fixture 40 or 140 is calculated from the offset angle.

At a seventh step 82, measurements of the dimensional characteristics of additional connectors 20 or 30 may be made by repeating the first, second and third steps 72, 74 and 76 by adjusting the resulting measurements with the calibration factor obtained in sixth step 80.

Accordingly, by using the fixture 40, 140, there is provided a method for inspecting the geometry and end face angle of a guide pin based multi-fiber connector, with an optical interferometer.

This method 70 is also suitable for multi-fiber connectors or ferrules that are polished at an angle, the typical angle being 8 degrees. In this case, the guide holes 32 in the female connector 30 are still perpendicular to the normal ideal flat polish. For measuring an angled connector (not shown) with an interferometer, it is standard practice to use a precision tilt stage (not shown) to tilt the connector up to the angle at which it is polished and to view and measure it as if it were a normal flat polish. It will be appreciated by those of ordinary skill in the art that the same calibration factor calculated for the fixture 40, 140 could be used to calculate the true angle of an angle polished connector (not shown) for this scenario as well.

Those skilled in the art will understand from the above disclosure that changes could be made to the embodiments described and without departing from the broad inventive concept thereof. It is understood, therefore, that this invention is not limited to the particular embodiments disclosed, but it is intended to cover modifications within the spirit and scope of the present invention.

I claim:

1. A holding fixture for use with an interferometric optical microscope, the fixture being adapted to receive an optical fiber connector having first and second guide holes, the fixture comprising:
    a base plate mountable along a first surface of the base plate to a mounting surface of the microscope and having an opening extending through the base plate and sized to complementarily receive the optical fiber connector and to guide the optical fiber connector into an operative position relative to the microscope;
    an aperture plate connected to the first surface of the base plate, the aperture plate having an aperture overlapping the base plate opening;
    the aperture plate further including first and second guide pins adapted to fit within the connector guide holes when the optical fiber connector is received within the base plate opening,
    wherein the fixture allows the optical fiber connector to be held in a precise and repeatable orientation relative to the microscope in turn facilitating accurate and precise measurements of dimensional characteristics of the optical fiber connector.

2. The fixture of claim 1, wherein the guide pins have a length of 4.5 mm ± about 0.5 mm.

3. The fixture of claim 1, wherein the base plate, aperture plate and guide pins are fabricated from stainless steel.

4. The fixture of claim 1, wherein the base plate, aperture plate and guide pins are fabricated from carbide steel.

5. The fixture of claim 1, wherein longitudinal axes of the guide pins are oriented generally parallel to each other.

6. The fixture of claim 1, wherein longitudinal axes of the guide pins are oriented generally perpendicular to an upper surface of the aperture plate.

7. The fixture of claim 1, wherein longitudinal axes of the guide pins are oriented with a predetermined angular offset.

8. The fixture of claim 1, wherein the guide pins have a generally circular cylindrical shape of constant diameter.

9. The fixture of claim 1, wherein the guide pins have a relief cut into a middle portion of the pins.

10. A holding fixture for use with an interferometric optical microscope, the fixture being adapted to receive an optical fiber connector having first and second guide pins, the fixture comprising:
    a base plate mountable along a first surface of the base plate to a mounting surface of the microscope and having an opening extending through the base plate and sized to receive the optical fiber connector and to guide the optical fiber connector into an operative position relative to the microscope;
    an aperture plate mounted to the first surface of the base plate, the aperture plate having an aperture overlapping the base plate opening;
    the aperture plate further including first and second guide holes adapted to directly receive the first and second connector guide pins therein, respectively,
    wherein the fixture allows the optical fiber connector to be held in a precise and repeatable orientation relative to the microscope in turn facilitating accurate and precise measurements of dimensional characteristics of the optical fiber connector.

11. The fixture of claim 10, wherein the aperture plate is fabricated from carbide steel.

12. A method of measuring dimensional characteristics of an optical fiber connector, comprising the steps of:
    providing an interferometric microscope having a holding fixture connected thereto, the fixture being adapted to receive and hold, in a fixed, repeatable orientation, the optical connector;
    installing the optical fiber connector in the fixture in a first orientation;
    operating the microscope to obtain a first set of measurements of three dimensional characteristics of the optical fiber connector;
    removing the optical fiber connector;
    rotating the optical fiber connector 180 degrees about a longitudinal axis of the connector;
    re-installing the optical fiber connector within the fixture;
    operating the microscope to obtain a second set of measurements of the dimensional characteristics of the optical fiber connector; and
    calculating an offset angle based upon a range between the first and second measurements.

13. The method of measuring dimensional characteristics of an endface of an optical fiber connector of claim 12, further comprising the step of calculating a calibration factor for the fixture based on the offset angle.

* * * * *